United States Patent [19]

Hull et al.

[11] Patent Number: 4,896,574

[45] Date of Patent: Jan. 30, 1990

[54] SELF SHARPENING WOOD LOG SLICER

[76] Inventors: Harold L. Hull, 401 Canyon Way, Sp. 43; Carroll T. Tostenson; Drusilla M. Tostenson, both of 973 Holman Way, all of Spanks, Nev. 89431

[21] Appl. No.: 248,726

[22] Filed: Sep. 26, 1988

[51] Int. Cl.[4] .................... B23D 35/00

[52] U.S. Cl. .................... 83/675; 83/601; 83/607; 83/626; 144/193 A; 144/363

[58] Field of Search .................... 83/597, 601, 605, 607, 83/610, 613, 626, 673, 675; 144/34 R, 34 E, 3 K, 193 R, 193 E, 363

[56] References Cited

U.S. PATENT DOCUMENTS 2,526,362 10/1950 Johnston .................... 83/601
3,004,458 10/1961 Dvorak .................... 83/607
4,151,868 5/1979 Fischer .................... 83/675
4,160,470 7/1979 Sigmund .................... 144/193 A

FOREIGN PATENT DOCUMENTS 419036 3/1947 Italy .................... 144/167

*Primary Examiner*—W. Donald Bray

[57] ABSTRACT

An improved log slicer requiring less power to operate due to the slicing action of the blade as opposed to the straight through crushing action of the prior art and as less power is required the blade can be made thinner as it does not bend, deflect or break as readily, and the slicing action also sharpens the blade with each stroke, making for increased production as there is no down time and the machine is much faster than the prior art shears.

7 Claims, 1 Drawing Sheet

Fig 1
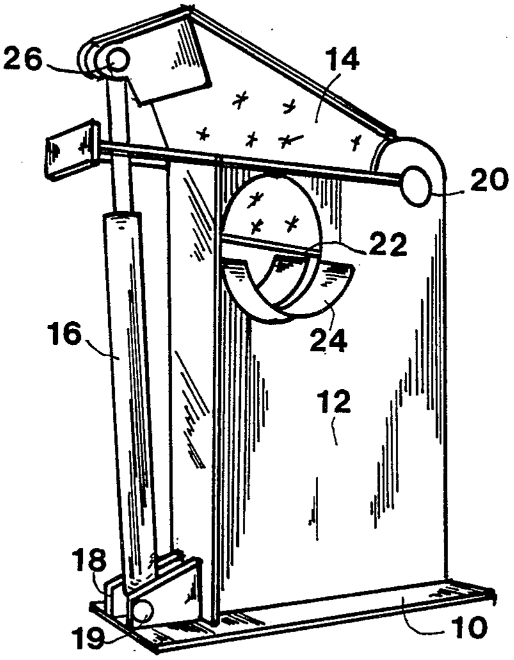
prior art
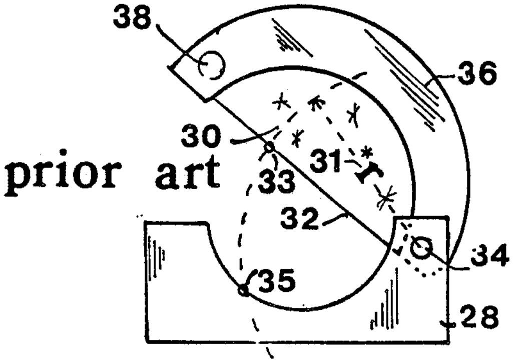
Fig 2
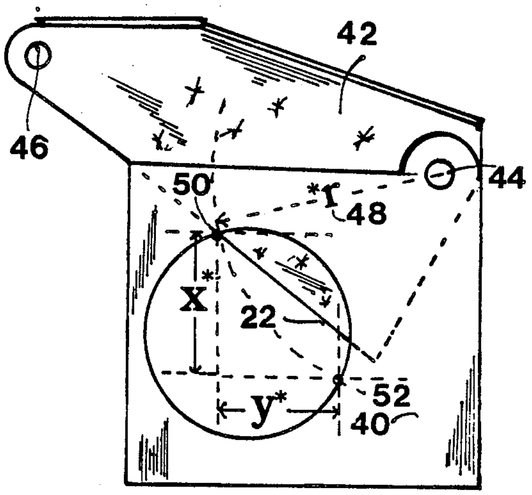
Fig 3

SELF SHARPENING WOOD LOG SLICER

BACKGROUND OF THE INVENTION

This invention relates to improvements in shear blades and more particularly to an improved shear blade construction as used in the logging and fireplace wood cutting industry.

Hydraulically activated shears have been used successfully for a number of years, either as a part of a tree harvesting apparatus or as part of a shearing attachment. Such shears generally comprise either a single pivotal blade acting against an anvil, a pair of opposing scissor like blades, or a guillotine like shear.

Since their inception log and tree shears have proved to be quite effective and efficient with regards to speed of operation, capacity, and reliability as compared to conventional sawing. However, there are certain areas in which such mechanical shears still fall short of desired results.

One problem area is in the quality of the cut sections. While shears are generally capable of cutting a log quickly, they tend to split and otherwise damage a portion of the log on either side of the cut. Any such damage results in waste and unsightly sections.

Another problem area is the amount of force necessary to force the shear through the log as this force can put un-acceptable loads on other components in the system and require a substantial power source equal to the task.

Still another problem is the shear blade deflection which occurs as the shear moves through the log, resulting in bending or breaking the blade.

Yet another problem is the required sharpening of the shear which occurs when the cutting edge is dulled by the brute force of pushing the shear straight through the log.

Still another problem is the thickness of the blade which must be substantial in order to keep the blade from bending or breaking which becomes self defeating as the thicker the blade, the more force is required to force it through the log.

Other problems are apparent in the guillotine type of blades which require long guide rails which are easily clogged with debris which causes the blade to bind and fail.

SUMMARY OF THE INVENTION

The log shear of the present invention overcomes the problems associated with the prior art shears.

It is therefore a primary object of the present invention to provide a shear which shears the log in the conventional manner, that is, forcing the shear straight through the log, but at the same time moving the blade edge in a slicing motion.

Another object is to provide this said slicing motion by mounting the pivot point at such a point as to provide the necessary downward thrust which at the same time produces the slicing or lateral motion.

Still another object is to provide such a slicing motion in order to reduce log damage on either side of the cut and produce a clean un-distorted cut.

Yet another object is to substantially reduce the power requirement to operate the shear blade.

Another object is to reduce the thickness of the blade as the power requirements are reduced.

Also an important object is to provide a self sharpening blade which sharpens itself with each stroke and does not require sharpening by the operator.

Yet another object is to provide a blade design that does not bend or break as it is not deflected due to the slicing motion.

Still another object is to build a shear which is faster in operation than a conventional prior art shear.

Other objects and advantages will become more apparent during the course of the following description when taken in connection with the accompanying drawings.

BRIEF DESCRIPTION OF THE DRAWINGS

FIG. 1 is a perspective view of the shear.

FIG. 2 is a side view of prior art.

FIG. 3 is a side view of the blade and support showing how the blade moves horizontally as well as vertically.

DETAIL DESCRIPTION OF THE DRAWINGS

Referring no in detail to the drawings, 10 is a base or platform for the shear structure while 12 are two upright sides which support shear blade 14 which is pivoted by bearing 20 while 18 are gussets which support bearing 19 which is attached to the cylinder end of hydraulic ram 16 while the shaft end of ram 16 is attached to blade 14 by bearing 26. 28 is the base of a shear demonstrating the prior art while 30 is a typical blade mounted at bearing 34 and supported by housing 36 with bearing 38 being attachable to a ram (not shown) with 32 being the cutting edge of shear 30. 40 is the base of a sea demonstrating the present invention while 42 is our new blade design mounted and pivoted by bearing 44, while 22 is the cutting edge of blade 42 being attached to a ram (not shown) at bearing 46. 33 is a theoretical point on the shearing edge 32 intersected by radius r* from center point 34 while 35 is the same theoretical point after the shear 30 has finished it"s stroke. Also 50 is a theoretical point on the shear"s cutting edge 22 intercepted by radius r* from center point 44, while 52 is the same theoretical point after the shear 42 has finished its stroke. X* is the distance traveled by point 50 in its vertical plane while Y* is the distance traveled in its horizontal plane.

Referring now to the prior art of FIG. 2, it will be seen that when the blade 32 is activated by ram (not shown) attached at bearing 38 and forced through a log resting in the device (not shown) that said blade 32 with its cutting edge 22 being pivoted at 34, can only move in an arc from its pivot point 34 producing a substantially "straight through" cut with substantially no lateral or horizontal movement, as shown by the movement of theoretical point 30 before the cut and theoretical point 35 after the cut. This crushing effect damages the log and takes a great deal of force to force the blade thru the log resulting in substantial power requirements, strong support systems such as hydraulic pumps, hoses, valves, etc., while putting a great deal of stress on the shear blade, resulting in blade damage. No sharpening effect occurs at the cutting edge as the blade has no lateral motion against the abrasive action of the sand, dirt, moisture content and the natural wood pulp of the log.

Referring now to FIG. 3 it will be seen that when the blade 42 is activated by ram (not shown) attached at bearing 46 and forced through a log resting in the device (not shown) that said blade 42 with its cutting edge 22 being pivoted at 34 moves in it's X* and Y* plane as shown by theoretical point 50 on the cutting edge 22 before the stroke and the same point 52 after the shear has finished its stroke. This produces a slicing action as the theoretical point 50 moves substantially as much in the horizontal plane Y* as it does in the vertical plane X*. This action is similar to the slicing action of a knife cutting a loaf of bread, as it is common knowledge that a knife when pushed straight down on a loaf of bread, tends to crush the bread, however, if the same knife stroke moves laterally at the same time, it slices the bread without crushing it. This slicing action of the shear, sharpens the blade as it moves laterally across the grain of the log and the sand, dirt, water content etc, contained in the log. Hardwood allows the blade to cut even better than soft wood as the blade gets even sharper as it is "honed" against the grain of the hardwood. It is common knowledge that knives and razors used to be sharpened against a block of oiled hardwood or leather to produce its finest honed edge and our new shear blade takes advantage of this action.

Also the slicing motion of the blade tends to keep blade from deflecting or bending as no one point on the blade stays in the same relationship to the log (as occurs in the prior art) when the blade engages a particularly hard part such as a knot or twisted grain sections, etc.

Also due to the slicing action of our new blade the process may be speeded up as the logs are not being crushed but are being sliced and the blade sharpened with each stroke.

It will readily be seen, then, that a shear built as shown in FIG. 1 and herein described, produces unusual result over the prior art by moving the pivot point at one extreme edge of the shear substantially away from and above the line of the cutting edge It will also be noted that we have produced a slicing effect by the location of said pivot point.

It will also be observed that said slicing motion has reduced log damage on both sides of the cut leaving a smooth, clean, cut surface even through obstructions such as knots, etc.

It is also readily seen that the power requirements of the shear has been greatly reduced.

It is also noted that the blade thickness may be reduced over the prior art as the power requirements have also been reduced.

Also important unusual results will be observed as the blade becomes self-sharpening thus reducing the "down" time of the machine and increased productivity.

It will also readily be observed that the blade does not tend to bend, break or deflect as no one point of the blade stays in the same relationship to any one point or plane in the log as occurs in the prior art.

Although the invention has been herein shown and described in what is conceived to be the most practical and preferred embodiments, it is recognized that departures may be made therefrom within the scope of the invention, which is not to be limited to the details disclosed herein but it is to be accorded the full scope of the claims so as to embrace any and all equivalent devices and apparatus.

Having described our invention, what we claim as new and desire to secure by letters patent is:

1. A log slicer comprising; a substantially rectangular base plate structure, a slicing blade, said slicing blade having at least one sharpened edge, said slicing blade containing a mountable bearing, said bearing defining a pivot point of said blade, said bearing and said pivot point being located on a vertical line drawn substantially from one end of said sharpened edge, said vertical line defining multiple points at which said bearing and said pivot point may be mounted, said multiple points determining the amount of slicing action of said slicing blade, means connecting said base plate and said slicing blade at said bearing, means to reciprocate said slicing blade in a general direction toward and away from said base plate and means to hold object to be sliced in relation to said slicing blade to allow said sharpened edge to penetrate and sever said object to be sliced.

2. The device of claim 1 whereby said means to reciprocate said slicing blade is a hydraulic ram.

3. The device of claim 1 whereby said structure connecting said base plate and said slicing blade are two substantially rectangular plates affixed at substantially right angles to said base plate and separated by at least the thickness of said slicing blade.

4. The device of claim 3 whereby the surfaces between said structure of the substantially rectangular plates and the slicing blade contain means to reduce friction.

5. The device of claim 1 whereby said substantially rectangular base plate structure is mounted on a mobile vehicle.

6. The device of claim 1 or 3 whereby said means to hold object to be sliced are curved plate structures one on each side of and affixed to said rectangular plates in such a manner as to allow the said slicing blade to penetrate between them at the extreme of one of its strokes.

7. The device of claim 2 whereby said hydraulic ram is pivotabley mounted at a first end to said base plate with a second end being pivotable affixed to said slicing blade.

* * * * *